Figure 1:
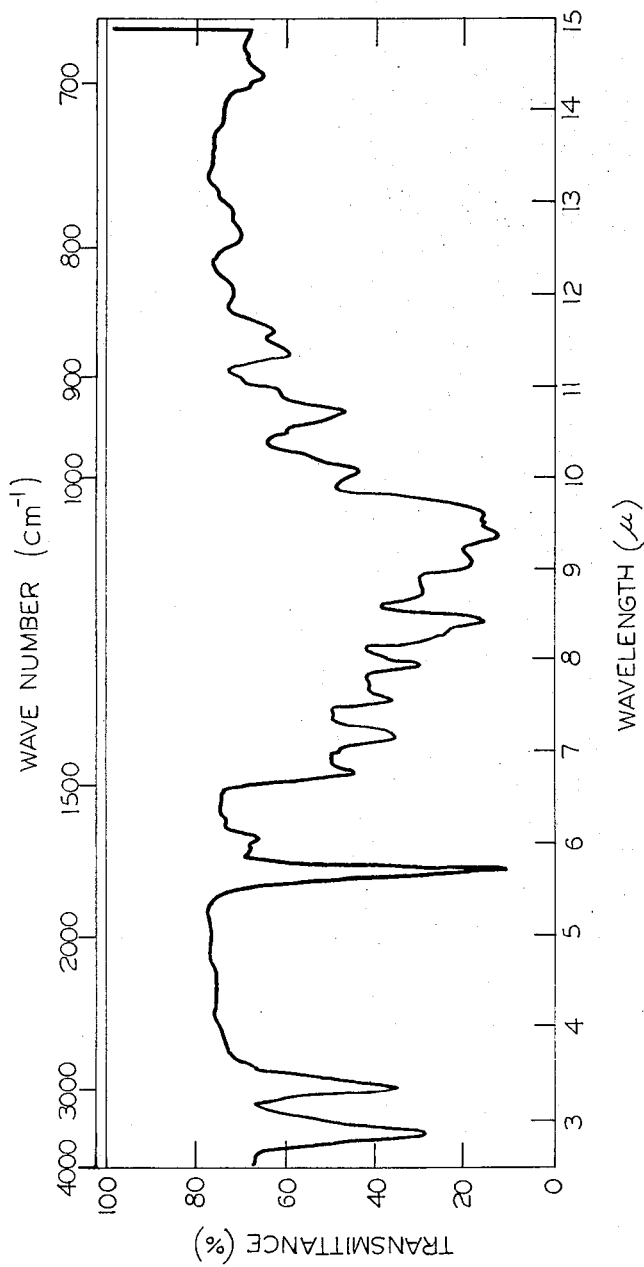

United States Patent
Higashide et al.

[15] 3,691,280
[45] Sept. 12, 1972

[54] ANTIBIOTIC B-5050 AND PRODUCTION THEREOF

[72] Inventors: Eiji Higashide, Takarazuka; Toru Hasegawa, Kawanishi; Hideo Ono, Kobe; Mitsuko Asai; Masayuki Muroi, both of Osaka; Toyokazu Kishi, Nara, all of Japan

[73] Assignee: Takeda Chemical Industries, Ltd. Osaka, Japan

[22] Filed: Aug. 13, 1970

[21] Appl. No.: 63,581

[30] Foreign Application Priority Data

Aug. 13, 1969 Japan ..................44/64080

[52] U.S. Cl. .....................424/119, 424/120, 195/80
[51] Int. Cl. ..............................................A61k 21/00
[58] Field of Search ................424/119, 120; 195/80

[56] References Cited
OTHER PUBLICATIONS

Miller, The Pfizer Handbook of Microbial Metabolites, McGraw–Hill Book Co., Inc., New York, N.Y., 1961, page 580.

*Primary Examiner*—Jerome D. Goldberg
*Attorney*—Wenderoth, Lind & Ponack

[57] ABSTRACT

New antibiotic B-5050 is produced by culturing an antibiotic B-5050-producing micro-organism belonging to the genus Streptomyces in a culture medium containing assimilable carbon source and digestible nitrogen source under aerobic conditions until antibiotic B-5050 is substantially accumulated in the culture broth. Active ingredients of antibiotic B-5050 are antibiotics B-5050-A, B-5050-B, B-5050-C, B-5050-D, B-5050-E, and B-5050-F. The active ingredients and mixtures thereof are antimicrobially active.

14 Claims, 7 Drawing Figures

ANTIBIOTIC B-5050 AND PRODUCTION THEREOF

This invention relates to novel antibiotic B-5050 and to the production of the same.

It has been found by the present inventors that a group of new antibiotic substances is produced by a micro-organism belonging to the genus Streptomyces and is accumulated in the culture broth, and that the respective members or components of the new antibiotics are closely related to each other in their properties as well as in their chemical structures but that they can be recovered from the culture broth in a desired degree of purity, separately into each member or a mixture of two or more of them. The group of the new antibiotics has been collectively named as "Antibiotic B-5050."

It has also been found that there exist, as the active ingredients of said antibiotic B-5050, those antibiotics which have been named as antibiotics B-5050-A, B-5050-B, B-5050-C, B-5050-D, B-5050-E and B-5050-F. It is, therefore, to be noted that in the present specification, including also the claims, each of these active ingredients and a mixture of two or more of them are collectively referred to as simply "Antibiotic B-5050" unless otherwise noted.

It is the principal object of the present invention to provide the new and useful antibiotic B-5050, collectively or separately into each member or a mixture of the members.

Another object is to provide a method for producing said useful antibiotic B-5050 by means of microbial fermentation.

Further object is to provide the means for isolation of the product, antibiotic B-5050, collectively or separately into each member or a mixture of the members.

Said objects are realized by cultivating an antibiotic B-5050-producing microorganism of the genus Streptomyces in a suitable culture medium until antibiotic B-5050 is substantially accumulated in the culture broth, and recovering the product therefrom.

For realizing said objects, those microorganisms which belong to the genus Streptomyces and which are capable of producing antibiotic B-5050 are employed. These microorganisms include, for example, *Streptomyces hygroscopicus* No. B-5050 (ATCC 21582) which was isolated by the present inventors from a soil sample of Chichibu, Saitama, Japan. The microbiological characteristics of this organism are shown below. In the following description, the color names designated "Rdg." are based on Ridgway's "Color Standards and Color Nomenclature," and the observations are on cultivations at 28°C for 14 days unless otherwise noted. The abbreviations "G.," "A.," "R." and "SP" means "growth," "aerial mycelium," "reverse" and "soluble pigment" respectfully.

MORPHOLOGICAL CHARACTERISTICS

Spore bearing hyphae are looped or spiral. Each spore is ellipsoidal or cylindrical, the size being about 0.7 to 1.7 microns by about 0.9 to 1.4 microns, with smooth surface.

CULTURAL CHARACTERISTICS

1. Czapek's agar
   G.: good, colorless to pale yellowish brown.
   A.: good, velvety, white to Pale Olive Gray (Rdg.LI, 23′′′′′-f) or Light Olive Gray (Rdg. LI,23′′′′′-d), with black patches.
   R.: Smoke Gray (Rdg.XLVI, 21′′′′-d).
   SP: none.
2. Glucose Czapek's agar
   G.: moderate, colorless.
   A.: moderate, white to Pale Drab Gray (Rdg. XLVI, 17′′′′-f).
   R.: colorless to Pale Drab Gray (Rdg.XLVI, 17′′′′-f).
   SP: Pale Vinaceous-Fawn (Rdg.XL, 13′′′-f).
3. Glycerin Czapek's agar
   G.: moderate, colorless.
   A.: moderate, powdery, white to Pale Drab Gray (Rdg.XLVI, 17′′′′-f).
   R.: Cream Color (Rdg. XVI, 19′-f).
   SP: none.
4. Glucose asparagine agar
   G.: moderate, colorless to pale yellow.
   A.: moderate, white to grayish brown, with black patches.
   R.: Cream Color (Rdg.XVI, 19′-f) to Smoke Gray (Rdg.XLVI, 21′′′′-d).
   SP: none or pale yellowish brown.
5. Nutrient agar
   G.: moderate, spreading, colorless to faint yellow.
   A.: moderate, white.
   R.: Cream Color (Rdg.XVI, 19′-f).
   SP: faint yellow.
6. Nutrient broth
   G.: poor to moderate, colorless, sink to the bottom.
   A.: none
   SP: none.
7. Glycerin nutrient agar
   G.: good, wrinkled, colorless to faint yellow.
   A.: good, white.
   R.: Cream Buff (Rdg.XXX, 19′′-f).
   SP: yellow to golden yellow.
8. Glucose nutrient agar
   G.: good, wrinkled, colorless to faint yellow.
   R.: Sorghum good, white to Pallid Mouse Gray (Rdg.LI, 15′′′′′-f).
   R.: Sorghum Brown (Rdg.XXXIX, 19′′′-i).
   SP: Fawn Color (Rdg.XL, 13′′′).
9. Starch agar
   G.: poor, colorless.
   A.: none or poor, white.
   R.: pale yellow,
   SP: none.
10. Yeast extract agar
    G.: good, wrinkled, colorless to faint yellow.
    A.: good, white.
    R.: Cream Buff (Rdg.XXX, 19′′-d).
    SP: yellow to golden yellow.
11. Egg: cultivated at 37°C)
    G.: moderate, spreading.
    A.: moderate, powdery, white.
    SP: none.
12. Potato plug
    G.: good, wrinkled, raised, pale brown.
    A.: poor, white to Pallid Mouse Gray (Rdg.LI, 15′′′′′-f).
    SP: none.
13. Carrot plug
    G.: good, wrinkled.

A.: moderate, white.
SP: none.
14. Litmus milk (cultivated at 37°C)
G.: ring formed, later sinks to the bottom.
A.: none.
Peptonization without coagulation.
15. Löffler's serum (cultivated at 37°C)
G.: moderate, glistening, colorless.
A.: none or poor, white.
SP: none
No liquefaction.
16. Gelatin stub (cultivated at 24°C for 25 days)
G.: poor, restricted, pale yellow.
A.: poor, white.
No liquefaction.
17. Cellulose
No growth.
18. Calcium malate agar
G.: moderate, colorless.
A.: moderate, powdery, white.
R.: Buff Pink (Rdg.XXVIII, 11″-d).
SP: Vinaceous-Cinnamon (Rdg.XXIX, 13″-b).
19. Tyrosine agar
G.: moderate, colorless.
A.: poor, white to Light Drab (Rdg.XLVI, 17″″-b).
R.: Drab Gray (Rdg.XLVI,17″″-d) to Light Drab (Rdg.XLVI, 17″″-b).
SP: NONE. none.
20. Peptone agar
G.: poor, colorless.
A.: poor, white.
R.: colorless.
SP: none.
21. Nitrate reduction
Positive on Czapek's broth and on peptone medium.
22. Starch hydrolysis
Growth zone    8 to 10 mm.
Enzymatic zone: 27 to 30 mm.

Thus, when this strain is cultured on a synthetic medium, vegetative mycelia are colorless or pale yellow to pale brown, and soluble pigment is not formed or, when formed, it is Pale Vinaceous-Fawn (Rdg.XL, 13‴-f) or pale purple to pale yellowish brown. Aerial mycelia are firstly white, later colored Pale Olive Gray (Rdg.LI, 23″″″-d) to Pale Drab Gray (Rdg.XLVI,17″″″-f), or in some cases turn to black. When cultured on a protein-containing medium, this strain shows colorless or yellow to Fawn Color (Rdg.XL,13‴), but does not form melanoid pigment, implying that this strain is a non-chromogenic type.

UTILIZATION OF CARBON SOURCES

Observations according to the method of Pridham and Gottlieb (Journal of Bacteriology, Vol. 59, p. 107 (1948)) on culture incubated at 28°C for 10 days are shown in Table 1.

TABLE 1

| Carbon source | Growth | Carbon source | Growth |
| --- | --- | --- | --- |
| Erythritol | ± | Maltose | +++ |
| Adonitol | +++ | Sucrose | +++ |
| D-Sorbitol | +++ | Lactose | ++ |
| i-Inositol | ++ | Raffinose | +++ |
| D-Mannitol | +++ | Trehalose | +++ |
| Dulcitol | ± | Salicin | − |
| D-Xylose | + | Esculin | − |
| L-Arabinose | + | Inulin | ± or + |
| L-Sorbose | ± | D-Mannose | +++ |
| D-Galactose | +++ | Starch | +++ |
| D-Glucose | +++ | Glycerin | +++ |
| D-Fructose | +++ | Na-Acetate | + |
| Rhamnose | ± | Na-Succinate | ++ |
| Melibiose | +++ | None (Control) | − |

Remarks for Table 1:
+++: Abundant growth
++ : Good growth
+ : Moderate growth
± : Poor growth
− : No growth In comparison of said microbiological characteristics of Strain No. B-5050 with those of known organisms with reference to S. A. Waksman's "The Actinomycetes" Vol. 2 (published by The Williams & Wilkins Co. in 1961), it is noted that this strain has a close resembrance to *Streptomyces hygroscopicus* in most features, except for producibility of soluble pigment on synthetic media, cellulose decomposition, nitrate entrate reduction, etc. From these observations, it is considered that Strain No. B-5050 is of *Streptomyces hygroscopicus*. A specimen of this has been deposited at the Institute for Fermentation, Osaka, Japan under the accession number of IFO-12995 and at American Type Culture Collection, Rockville, Md., U.S.A. under the accession number ATCC 21582. Thus, in the present specification, this strain is referred to as "*Streptomyces hygroscopicus* No. B-5050" or simply Strain No. B-505, and it is to be noted that "*Streptomyces hygroscopicus* (ATTC 21582) or (IFO-12995)" means a specimen representing this strain.

Antimicrobial spectrum of Strain No. B-5050 by Crosses streak method is shown in Table 2. The result was obtained by streaking this strain on a nutrient agar plate (pH 7.0) or a glycerin nutrient agar plate (pH 7.0), cultivating the streaked organism at 28°C for 4 days, cross-streaking a test organism illustrated in Table 2 to the streak of this strain on the plate, again cultivating at 37°C, for 18 hours (in case of common bacteria) or for 40 hours (in case of acid-fast bacteria), and measuring the inhibitory zone in length. From this result, it is observed that Strain No. B-5050 strongly inhibits the growth of Gram-positive bacteria, and also inhibits that of *Mycobacterium avium*.

TABLE 2

| Test Organism | Inhibitory Length (mm.) | |
| --- | --- | --- |
| | Nutrient Agar | Glycerin Nutrient Agar |
| *Escherichia coli* | 0,         0 | 0,         0 |
| *Proteus vulgaris* | 0,         0 | 0,         0 |
| *Staphylococcus aureus* | 30,       32 | 29,       30 |
| do. (*1) | 0,         0 | — |
| *Bacillus subtilis* | >40,     >40 | 29,       28 |
| *Bacillus cereus* | 26,       30 | 27,       27 |
| *Bacillus brevis* | 31,       23 | |
| *Sarcina lutea* | 35,       39 | 34,       35 |
| *Micrococcus flavus* | 34,       36 | 34,       36 |
| *Mycobacterium avium* | — | 20,       23 |

Remarks for TABLE 2:
(*1): Strain resistant to Oleandomycin and Erythromycin.
— : Not tested.

Observation of this strain according to cross streak-agar disc method (Motoo Shibata: Annual Reports of the Takeda Research Laboratories, Vol. 20, pp. 222 et seq. (1956)) using *Bacillus subtilis* as the test organism and nutrient agar plates as the test media has suggested that Strain No. B-5050 produces physiologically basic antibiotic. The result of the observation is summarized in Table 3.

TABLE 3

| Test Organism | pH of Test Medium | Inhibitory Length (mm) |
|---|---|---|
| Bacillus subtilis | 6 | 15, 15 |
| | 8 | 23, 23 |

Of course, as being well known, the microbiological characteristics of the organisms belonging to the family Actinomycetaceae, particularly of the genus Streptomyces, are not always fixed and are susceptible to mutations, regardless of whether the mutation is caused spontaneously or artificially, for example, with X-ray, ultraviolet ray, or by the action of chemical mutagenic compounds such as nitrogen mustard, nitrosoguanidine or heavy metal salts. *Streptomyces hygroscopicus* No. B-5050 is no exception, and may happen to give its mutants which exhibit somewhat different appearance from that of the parent strain e.g. in cultural observations. Among those mutants, any one can be employed in the method of the present invention as long as it produces antibiotic B-5050, In accordance with this invention, one of said antibiotic B-5050-producing organisms belonging to the genus Streptomyces is cultivated in a culture medium containing assimilable carbon source, digestible nitrogen source and other nutrients. The culture medium can be liquid or solid, but the liquid medium is more convenient. In the medium are incorporated one or more of assimilable carbon sources such as glucose, sucrose, maltose, dextrin, glycerin, starch syrup and the like, and one or more of digestible nitrogen sources such as peptone, soybean meal, cornsteep liquor, meat extracts, rice bran, wheat bran, urea, various ammonium salts (e.g. $NH_4Cl$, $NH_4NO_3$, $(NH_4)_2SO_4$ ) and the like, as well as small amounts of inorganic salts which are conventionally used for cultivating microorganisms, such as sodium chloride, phosphates, or particular metal salts of calcium, magnesium, zinc, manganese, iron or the like. In addition, growth promoting material may suitably be added, and an antiforming agent such as fat, oil or mineral oil may be added as occasion demands.

The antibiotic B-5050-producing strain often produces other antibiotic along with antibiotic B-5050 under usual conditions. In order to produce antibiotic B-5050 advantageously, it is recommended to select the strain and the culture medium. Thus, for example, when Strain No.B-5050 is used, a preferable culture medium is to contain about 3 to 5 percent of carbon source and about 1 to 2 percent of organic nitrogen source.

The cultivation may be carried out by stationary culture, but in general a submerged culture using aerated agitation is more advantageous. In the latter case, a preferable pH of the culture medium is neutral, i.e. pH about 6 to about 8, more preferably about 6.8 to 7.4, and the culture temperature lies between about 20° to 43°C, particularly in a range of 23° to 32°C.

The fermentation broth obtained as above contains the components of antibiotic B-5050. To isolate this group of antibiotics, use may be made of respective means which have heretofore been employed in recovering the metabolites of a microorganism from its fermentation broth. Thus, by taking advantage of the fact that this class of antibiotics are weakly basic and fat-soluble substances, they may be separated by the techniques utilizing those properties.

Since antibiotic B-5050 is accumulated predominantly in the liquid phase of the fermentation broth, the broth may first be filtered to eliminate the mycelium, and the active ingredients may then be extracted at a weakly basic pH with a water-immiscible organic solvent from the filtered broth. By way of example, the filtered broth is adjusted to a pH of about 7 to 10, and is extracted with an organic solvent which is immiscible, or not completely miscible, with water such as lower fatty acid esters (e.g. ethyl acetate, n-butyl acetate), halogenated aliphatic hydrocarbons (e.g. chloroform, ethylene chloride), ketones (e.g. methyl ethyl ketone, methyl isobutyl ketone), aromatic hydrocarbons (e.g. benzene, toluene), alcohols (e.g. n-butanol) or the like, or a mixture of two or more of them.

The portion of the antibiotics contained in the mycelium can be extracted, after the filtration of the broth, from the mycelium with a water-soluble organic solvent such as acetone or methanol or a diluted aqueous acid solution. From the organic solvent extracts, the active ingredients are recovered by filtration, concentration in vacuo and extraction with a water-immiscible organic solvent as explained above. From the aqueous acid solution, they can be recovered by filtration, adjustment to a neutral or weakly basic pH and extraction with said water-immiscible organic solvent.

The active ingredients in the fermentation may be adsorbed on an adsorbent such as activated charcoal, white carbon (or colloidal silica) or the like. The adsorbed active ingredients may then be eluted with a suitable developer or eluant, which is exemplified by an aqueous alcohol (e.g. aqueous methanol, aqueous ethanol), aqueous acetone, a mixture of such aqueous solution plus an acid, an organic solvent (e.g. ethyl acetate, chloroform) or the like.

Alternatively, by taking advantage of the basic property of antibiotic B-5050, the active ingredients can be adsorbed on a cation exchange resin such as "Amberlite IRC-50," "Amberlite IR-120" (both produced by Rohm & Haas Co., U.S.A.) or "Dowex 50" (produced by Dow Chemical, U.S.A.). The active ingredients adsorbed on such resin can then be eluted with a suitable eluant such as a diluted aqueous acid solution, a diluted aqueous basic solution, an aqueous acid methanol solution, an aqueous basic methanol solution, an aqueous acid acetone solution, an aqueous basic acetone solution or the like.

The organic extract thus obtained is further transferred into an aqueous acid solution, preferably after washing with water. The acid solution for this purpose may be a diluted aqueous acid solution or an acid buffer solution. The aqueous extract thus obtained is then adjusted to a neutral or weakly basic pH, and may again be extracted with a water-immiscible organic solvent as detailed above.

When the content of the active ingredients in the thus obtained organic solvent extract is relatively high, antibiotic B-5050 may crystallize solely by concentrating the extract in vacuo. When it is not the case, a nonpolar organic solvent such as petroleum ether or n-hexane is added to the concentrate, whereupon crude powdery antibiotic B-5050 separates. The powdery product can be crystallized from an organic solvent such as benzene, diethyl ether, ethyl acetate, or a mixture of ethyl acetate:n-hexane, acetone:n-hexane, acetone:water or ethanol:water.

When the crude powder includes some colored impurities, they can be removed by the use of activated charcoal.

In such particular case where antibiotic B-5050 cannot be crystallized even by said treatment, further purification may be applied thereto by means of such adsorbents as silica gel or alumina. The adsorbed ingredients can be eluted with a fatty acid ester (e.g. methyl acetate, ethyl acetate, n-butyl acetate), a mixed solvent (e.g. benzene : acetone, benzene : ethyl acetate, benzene : methanol, chloroform : methanol) or the like.

Antibiotic B-5050 mixture, as well as its respective components, is a basic substance, and can form respective salts with a water-soluble acid such as hydrochloric acid, sulfuric acid, tartaric acid, nicotinic acid or the like.

The following are to show the general properties of antibiotic B-5050 mixture, but it is to be noted that the specific values were obtained by the measurement on a sample of antibiotic B-5050 mixture produced in the manner as in Example 7, and there may naturally be some deviations from the specific values in case of other samples of antibiotic B-5050.

1. Melting point : 137° to 141°C.
2. Elementary analysis :
    Recrystallized from benzene:
        C: 58.14 ± 0.5; H: 7.88 ± 0.3; N: 1.73 ± 0.3
    Recrystallized from ethyl acetate:
        C: 57.83 ± 0.5; H: 8.14 ± 0.3; N: 1.33 ± 0.3
3. Molecular weight measured by vapor pressure osmosis:
    880 ± 90 (in ethyl acetate)
4. Specific rotation:
    $(\alpha)_D^{24}$: −76.4° ± 8° ($c$=1, ethanol)
5. Color reactions:
    Dragendorff reaction: positive.
    Erythromycin test : positive exhibiting reddish purple, while the chloroform layer being pale blue.
    Carbomycin test : negative.
6. Solubilities:
    Easily soluble in methanol, ethanol, acetone, ethyl acetate, methyl ethyl ketone, chloroform or an aqueous acid solution;
    Soluble in benzene or diethyl ether; Hardly soluble in n-hexane or neutral water;
7. Ultraviolet absorption:
    No significant maximum in methanol.
8. Infrared absorption:
    As shown in FIG. 1 (KBr disc), and the main absorption bands (cm$^{-1}$) are as follows:

3,448($s$), 2,924($m$), 1,736($s$), 1,453($m$), 1,376($m$), 1,295($m$), 1,239($m$), 1,167($s$), 1,081($s$), 1,050($s$), 968($m$), 912($m$), 861($w$), 840($w$).

Remark: The parenthesized abbreviations "$vs$," "$s$," "$m$," "$sh$" and "$w$" mean "very strong," "strong," "medium," "shoulder" and "weak," respectively, and the same applies to the description below on infrared spectra.

As mentioned above, the instant antibiotic consists of several components, and there have so far been acknowledged at least six components, which are closely related to each other in their chemical and biological properties. This fact is easily confirmed by subjecting the antibiotic mixture to paper chromatography or thin layer chromatography. The following are the examples of such identification of the respective ingredients.

1. Paper Chromatography
    Paper : Toyoroshi No. 50, impregnated with a 2 percent-liquid paraffin solution in ligroin.
    Developer: M/15-phosphate buffer solution of pH 8.0 saturated with n-butyl acetate.
    Detection: Bioautography employing *Bacillus subtilis* as the test organism.
    Rf-values:
        B-5050-A = 0.32 ± 0.05
        B-5050-B = 0.38 ± 0.05
        B-5050-C = 0.66 ± 0.05
        B-5050-D = 0.72 ± 0.05
        B-5050-E = 0.74 ± 0.05
        B-5050-F = 0.32 ± 0.05
2. Thin Layer Chromatography
    Thin layer:
        a. Silica gel ("Spotfilm *f*" manufactured by Tokyo Kasei K.K., Japan)preheated at 105°C for 1 hour.
        b. Silica gel ("Kieselgel G" manufactured by Merck A.G. Darmstadt, W. Germany)
        c. the same as (b)
    Developer:
        a. Benzene: Acetone (3:2 by volume)
        b. Benzene: Acetone (3:2 by volume)
        C. Benzene: methanol (10:1 by volume), but the development was repeated three times.
    Detection:
        a. Concentration H$_2$SO$_4$ sprayed.
        b. and (c): Treated as follows:
            1. 5 percent Phosphomolybdate solution in ethanol was sprayed and dried at 110°C for 5 minutes:
            2. 5 percent Cerium sulfate solution in N-H$_2$SO$_4$ was sprayed and dried at 110°C for 5 minutes;
            3. 10 percent aqueous H$_2$SO$_4$ solution was sprayed and dried at 110°C for 5 minutes; and
            4. Conc. H$_2$SO$_4$ or 5% I$_2$ solution in chloroform was sprayed.

Rf-Values:

|  | (a) | (b) | (c) |
| --- | --- | --- | --- |
| B-5050-A | 0.48 ± 0.05 | 0.68 ± 0.05 | 0.71 ± 0.05 |
| B-5050-B | 0.42 ± 0.05 | 0.63 ± 0.05 | 0.66 ± 0.05 |
| B-5050-C | 0.37 ± 0.05 | 0.57 ± 0.05 | 0.61 ± 0.05 |
| B-5050-D | 0.32 ± 0.05 | 0.53 ± 0.05 | 0.55 ± 0.05 |
| B-5050-E | 0.30 ± 0.05 | 0.50 ± 0.05 | 0.52 ± 0.05 |
| B-5050-F | 0.27 ± 0.05 | 0.43 ± 0.05 | 0.48 ± 0.05 |

In order to separate or isolate these ingredients in an industrial scale, it is recommended to employ techniques of adsorption chromatography, partition chromatography or countercurrent distribution.

Suitable adsorbent for the adsorption chromatography is exemplified by silica gel or alumina. When silica gel is employed, for example, the elution may be made with a mixture of a nonpolar organic solvent and a polar organic solvent, whereby the respective ingredients are fractionally eluted in the order of affinity to the nonpolar solvent, i.e. antibiotics B-5050-A, -B, -C, -D, -E and -F. Suitable mixed solvent as the eluant may be exemplified by benzene-ethyl acetate, benzene-acetone, n-hexane-methanol and chloroform-methanol.

As for the means to use the difference in distribution between two liquid phases, the combination of a lipophilic organic solvent (e.g. ethyl acetate) and an aqueous buffer solution is recommended. By using a buffer of pH 5.5, antibiotic B-5050-D,-E and -F can be transferred into the buffer, while B-5050-A, -B and -C remain in the organic solvent phase. From the latter solvent phase, B-5050-C can be extracted with a buffer of pH 4.9. With a buffer of pH 4.4, B-5050-B and -C can be extracted from the organic layer mentioned above, while B-5050-A remains in the organic solvent phase. In this manner, respective ingredients can finally be isolated.

Partition chromatography is another good means. There may be used, as the carrier of the stationary phase, such conventionally used materials as cellulose powder or diatomaceous earth (e.g. "Celite" or "Hyflo Super Cel," distributed by Johns Manville Sales Corp., U.S.A.).

Respective characteristics and properties of the active ingredients of antibiotic B-5050 are summarized in the following.

Figure 2:
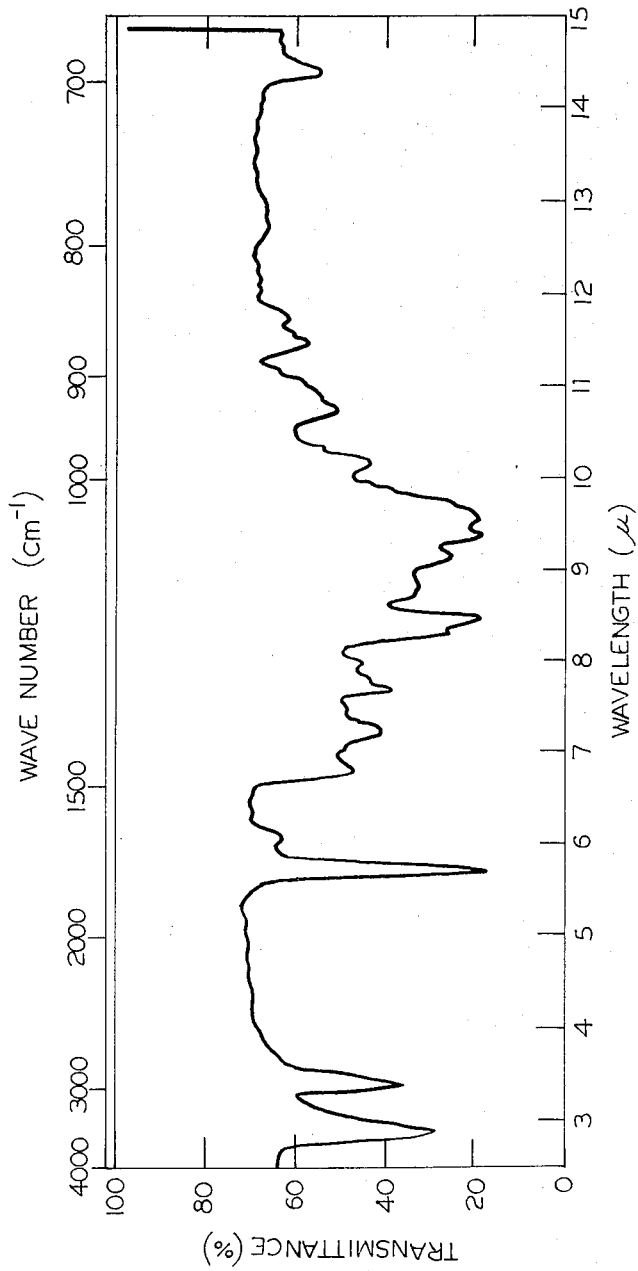
Figure 3:
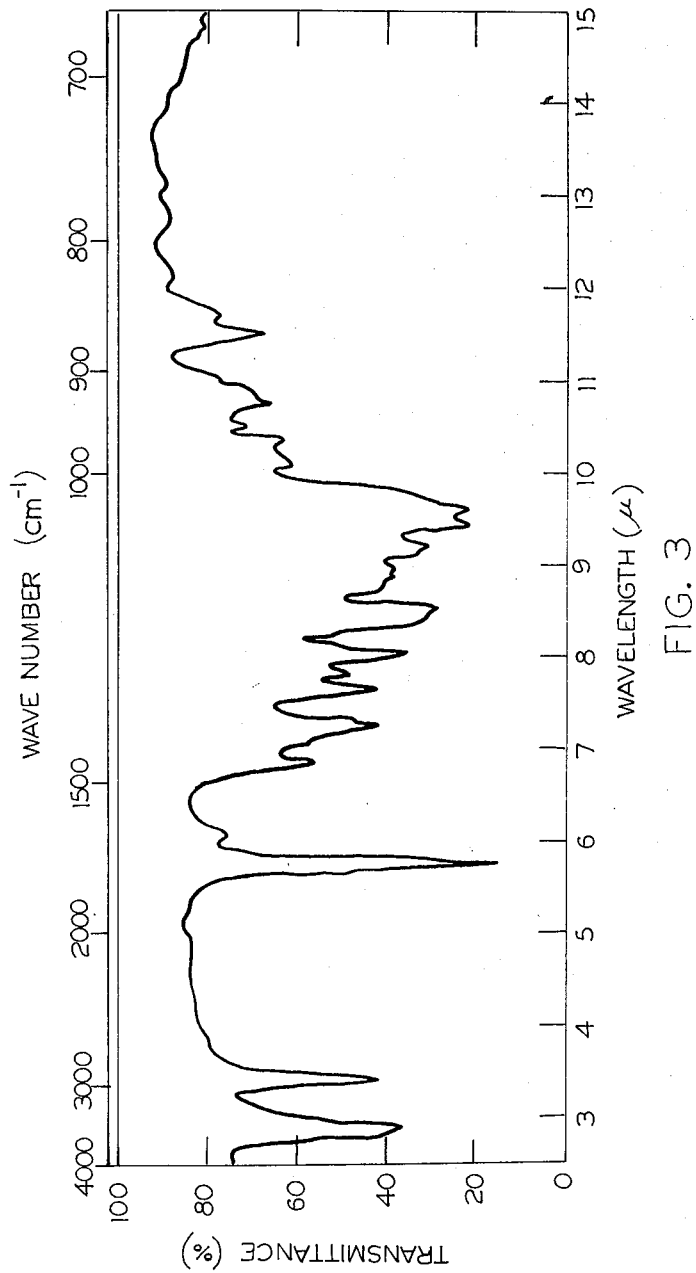
Figure 4:
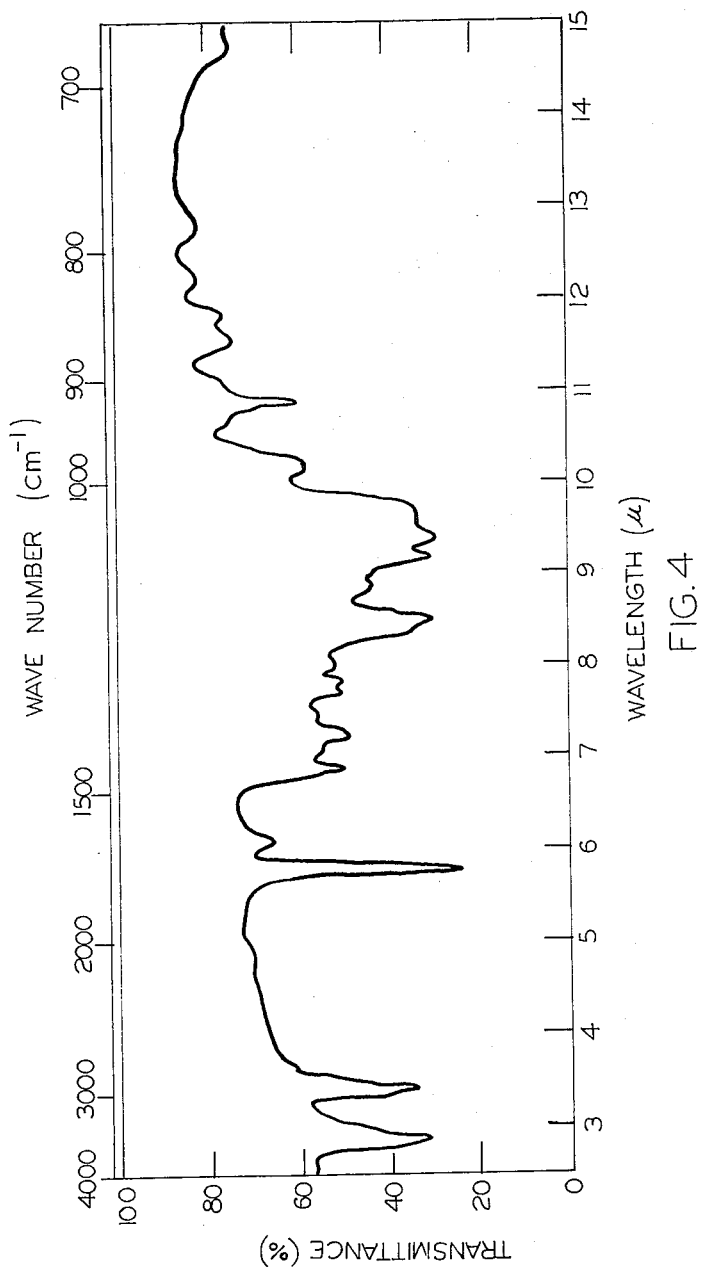
Figure 5:
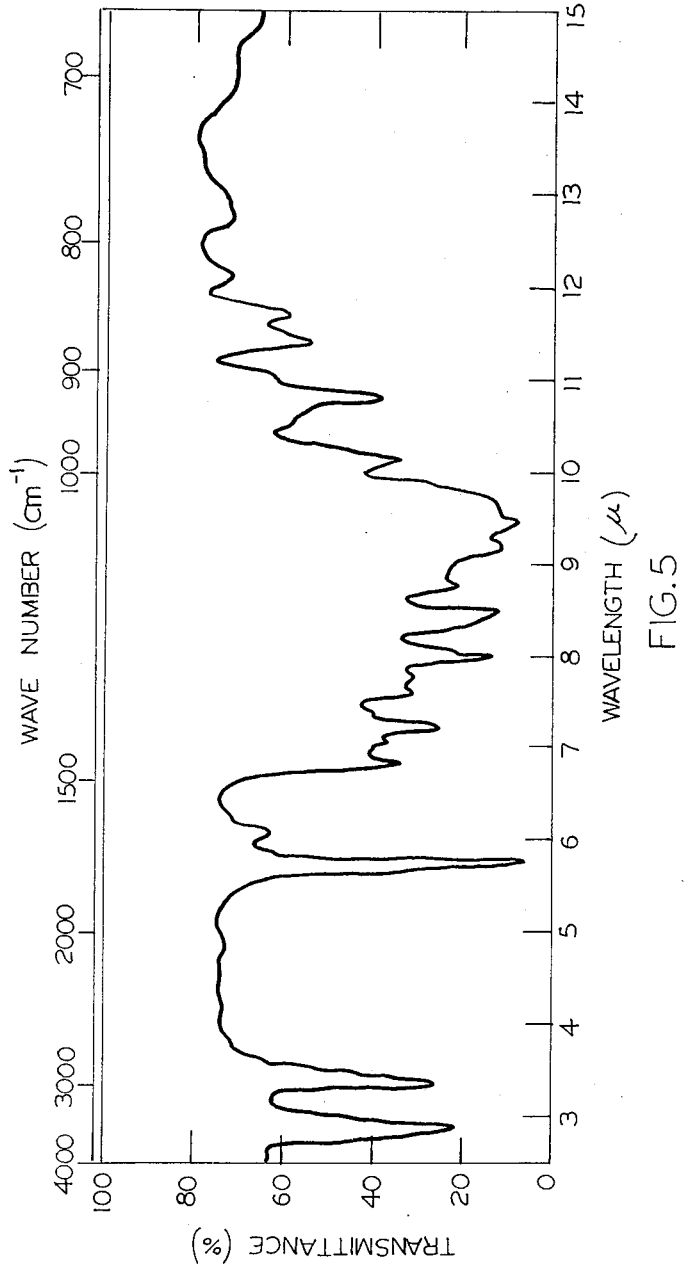
Figure 6:
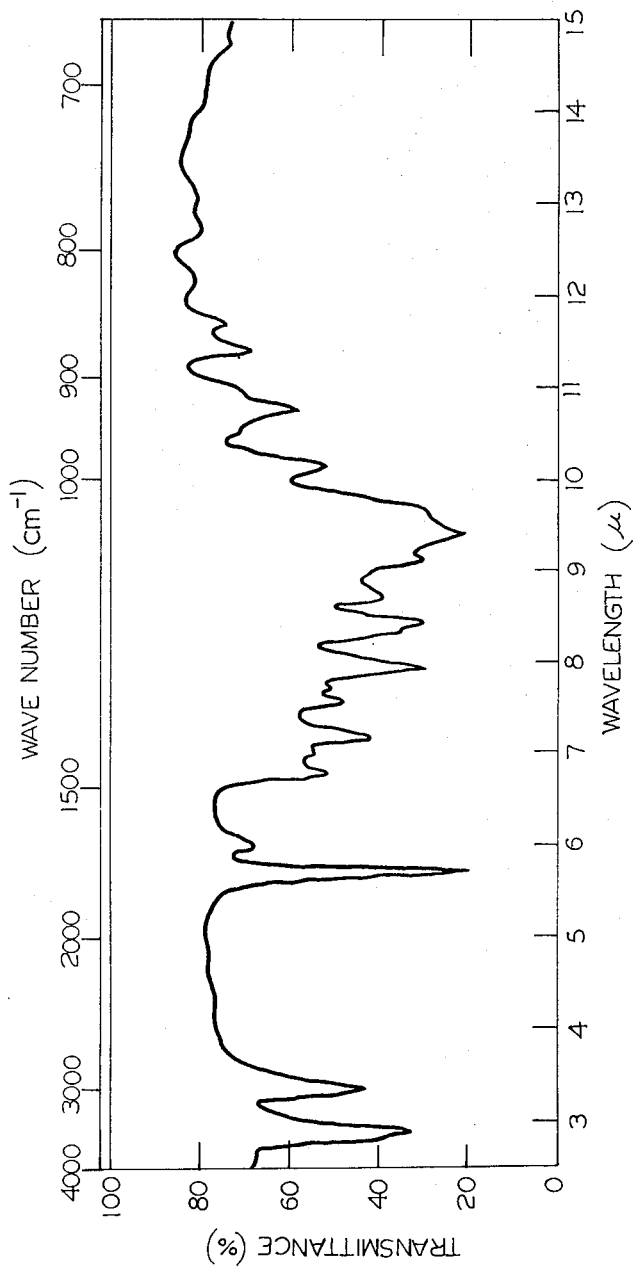
Figure 7:
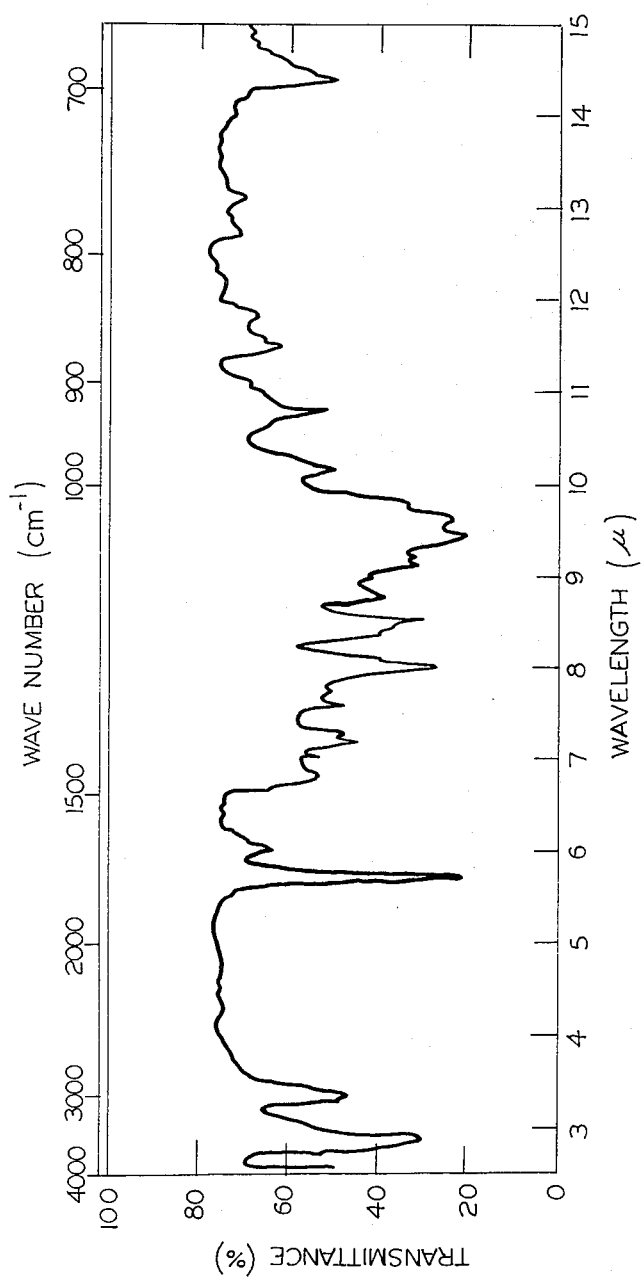

1. Melting point (with decomposition)
   Measured as to the samples recrystallized from a mixture of acetone and n-hexane (1:3 by volume)
   B-5050-A: 129° to 132°C
   B-5050-B: 134° to 136°C
   B-5050-C: 135° to 138°C
   B-5050-D: 143° to 146°C
   B-5050-E: 144° to 149°C
   B-5050-F: 149° to 154°C
2. Elementary analysis
   B-5050-A: C, 59.40±0.5; H, 8.15±0.3; N, 1.40±0.3
   B-5050-B: C, 58.67±1.0; H, 8.02±0.5; N, 1.86±0.5
   B-5050-C: C, 57.93±1.0; H, 8.18±0.5; N, 1.69±0.5
   B-5050-D: C, 57.48±1.0; H, 8.17±0.5; N, 1.64±0.5
   B-5050-E: C, 57.34±1.0; H, 8.25±0.5; N, 1.34±0.5
   B-5050-F: C, 58.59±0.5; H, 7.82±0.3; N, 1.62±0.3
3. Molecular weight
   All ingredients have a molecular weight of about 800 to 900, measured by vapor pressure osmosis method in ethyl acetate.
4. Specific rotation
   B-5050-A: $[\alpha]_D^{23}$: $-72.3°\pm7°$ ($c=1$, ethanol)
   B: $[\alpha]_D^{23}$: $-71.9°\pm7°$ ($c=1$, ethanol)
   C: $[\alpha]_D^{23}$: $-76.0°\pm8°$ ($c=1$, ethanol)
   D: $[\alpha]_D^{23}$: $-76.2°\pm8°$ ($c=1$, ethanol)
   E: $[\alpha]_D^{23}$: $-73.6°\pm7°$ ($c=1$, ethanol)
   F: $[\alpha]_D^{23}$: $-77.7°\pm8°$ ($c=1$, ethanol)
5. Color reactions
   All ingredients are positive to Dragendorff reaction and Erythromycin test, but negative to Carbomycin test.
6. Solubilities
   All ingredients are soluble in methanol, ethanol, acetone, methyl ethyl ketone, ethyl acetate, benzene, diethyl ether, chloroform or an aqueous acid solution, but hardly soluble in n-hexane or neutral water.
7. Ultraviolet absorption
   All ingredients exhibit no significant maximum absorption.
8. Infrared absorptions (KBr disc)
   B-5050-A: As shown in FIG. 2, and main absorption bands in wave number ($cm^{-1}$) are as follows:
   3,448($m$), 2,941($m$), 1,739($s$), 1,458($w$),
   1,374($m$), 1,295($m$), 1,188($s$), 1,167($s$),
   1,120($m$), 1,086($s$), 1,053($s$), 1,033($s$),
   971($m$), 917($w$), 862($m$).
   B-5050-B: As shown in FIG. 3, and main absorption bands in wave number ($cm^{-1}$) are as follows:
   3,500($s$), 2,990($s$), 2,960($s$), 1,740($vs$),
   1,454($m$), 1,370($m$), 1,296($m$), 1,233($s$),
   1,188($sh$), 1,166($vs$), 1,120($s$), 1,080($s$),
   1,052($vs$), 1,025($vs$), 968($m$), 916($w$), 858($w$),
   842($w$).
   B-5050-C: As shown in FIG. 4, and main absorption bands in wave number ($cm^{-1}$) are as follows
   3,460($s$), 2,980($s$), 2,940($s$), 1,735($vs$),
   1,455($m$), 1,375($s$), 1,357($s$), 1,295($s$),
   1,270($s$), 1,240($m$), 1,183($sh$), 1,162($vs$),
   1,080($vs$), 1,050($vs$), 1,028($sh$), 1,018($sh$),
   972($m$), 910($m$), 862($w$), 840($w$).
   B-5050-D: As shown in FIG. 5, and significant absorption bands in wave number ($cm^{-1}$) are as follows:
   3,440($s$), 2,946($m$), 1,735($vs$), 1,450($m$),
   1,373($m$), 1,357($sh$), 1,296($m$), 1,274($m$),
   1,237($s$), 1,163($s$), 1,127($m$), 1,083($s$),
   1,047($vs$), 1,031($sh$), 1,012($sh$), 972($m$),
   913($m$). 862($w$), 843($w$)
   B-5050-E: As shown in FIG. 6, and significant absorption bands in wave number ($cm^{-1}$) are as follows:
   3,430($s$), 2,920($m$), 1,732($vs$), 1,450($m$),
   1,373($m$), 1,354($m$), 1,296($m$), 1,239($s$),
   1,163($s$), 1,127($m$), 1,084($s$), 1,048($vs$),
   1,032($sh$), 1,011($sh$), 970($m$), 914($m$),
   862($w$), 840($w$).
   B-5050-F: As shown in FIG. 7, and significant absorption bands in wave number ($cm^{-1}$) are as follows:
   3,425($s$), 2,994($m$), 1,745($s$), 1,730($s$), 1,460($w$),
   1,379($m$), 1,362($m$), 1,300($m$), 1,242($s$), 1,166($s$),
   1,133($m$), 1,089($m$), 1,053($s$), 1,031($m$), 973($w$),
   919($w$), 864($w$).

Antimicrobial spectra of thus recovered Antibiotic B-5050 mixture and its respective ingredients (i.e. B-5050-A, -B, -C, -D, -E and -F) are shown in Table 4. For the measurements, common bacteria were cultured on a nutrient agar medium, while Mycobacterium species were cultured on a glycerin nutrient agar medium. Yeasts or other fungi were cultured on a glucose nutrient agar medium.

TABLE 4

Minimum Inhibitory Concentrations (mcg./ml.)

| Test Organism | Antibiotic B-5050 | | | | | |
|---|---|---|---|---|---|---|
| | Mixture A | B | C | D | E | F |
| Bacillus subtilis | 0.5 | 0.2 | 0.2 | 0.5 | 1 | 2 | 2 |
| Bacillus cereus | 1 | 0.5 | 0.5 | 1 | 2 | 5 | 5 |
| Bacillus brevis | 0.5 | 0.2 | 0.2 | 0.5 | 5 | 10 | 10 |
| Bacillus megaterium | 1 | 0.5 | 0.5 | 0.5 | 1 | 2 | 2 |
| Staphylococcus aureus | 1 | 0.5 | 0.5 | 1 | 2 | 5 | 5 |
| Staphylococcus aureus (*1) | 50 | 20 | 20 | 50 | >100 | >100 | >100 |
| Staphylococcus aureus (*2) | 50 | 20 | 20 | 50 | >100 | >100 | >100 |
| Sarcina lutea | 0.2 | 0.1 | 0.1 | 0.2 | 0.5 | 0.5 | 0.5 |
| Micrococcus flavus | 0.2 | 0.1 | 0.1 | 0.2 | 0.5 | 0.5 | 0.5 |
| Serratia marcescens | >100 | >100 | >100 | >100 | >100 | >100 | >100 |
| Escherichia coli | >100 | >100 | >100 | >100 | >100 | >100 | >100 |
| Proteus vulgaris | >100 | >100 | >100 | >100 | >100 | >100 | >100 |
| Pseudomonas aeruginosa | >100 | >100 | >100 | >100 | >100 | >100 | >100 |
| Mycobacterium avium | 50 | 50 | 100 | >100 | >100 | >100 | >100 |
| Mycobacterium avium (*3) | 50 | 50 | 100 | >100 | >100 | >100 | >100 |
| Mycobacterium avium (*4) | 50 | 50 | 100 | >100 | >100 | >100 | >100 |
| Mycobacterium smegmatis | 50 | 50 | 100 | >100 | >100 | >100 | >100 |
| Mycobacterium phlei | 50 | 50 | 100 | >100 | >100 | >100 | >100 |
| Mycobacterium 607 | 50 | 50 | 100 | >100 | >100 | >100 | >100 |
| Candida albicans | >100 | — | — | — | — | — | — |
| Saccharomyces cerevisiae | >100 | — | — | — | — | — | — |
| Penicillium chrysogenum | >100 | — | — | — | — | — | — |
| Aspergillus niger | >100 | — | — | — | — | — | — |
| Trichophyton | 100 | — | — | — | — | — | — |

Remarks for Table 4:
(*1) : Strain resistant to Oleandomycin and Erythromycin.
(*2) : Strain resistant to Streptomycin, chloramphenicol, Tetracycline, Oleandomycin and Erythromycin.
(*3) : Strain resistant to Streptomycin.
(*4) : Strain resistant to Dextromycin.
— : Not tested.

Antibiotic B-5050 is, as stated above, concluded as belonging to so-called "macrolide antibiotics" in view of its properties such as color reactions (e.g. Erythromycin Test), solubilities (e.g. lipophilic and basic), infrared spectra (e.g. the values of $V_{c=o}$ or $V_{c-o}$), antimicrobial spectra (e.g. differences in the minimum inhibitory concentrations between against an Erythromycin-and Oleandomycin-resistant strain and a susceptible strain of Staphylococcus aureus) and so on.

Among the macrolide antibiotics, antibiotic B-5050 differentiates itself from those which show maximal absorption at a wave length of 225, 230, 240 or 280–290 millimicrons. Erythromycin and Oleandomycin have relatively weak maximal absorption in a range of 280 to 290 millimicrons, but they differ from antibiotic B-5050 in their infrared absorption spectra, molecular weights, melting points, etc.

There have hitherto been known Carbomycin, Relomycin and Tylosin as the macrolide antibiotics which are produced by Streptomyces hygroscopicus. But they have a maximal absorption at the wave length of 238, 282 and 289 millimicrons, respectively, and clearly differ from antibiotic B-5050. Thus, it is concluded that antibiotic B-5050 is a new group of antibiotics, each of which is also novel.

Antibiotic B-5050, regardless of whether it is a mixture of the above-detailed active ingredients or an isolated active ingredient, has a strong antimicrobial activity, particularly against Gram-positive bacteria, and is characterized an unusually low toxicity against warm-blooded animals including mankind. For example mean effective dose ($ED_{50}$) of antibiotic B-5050 mixture in mice infected with Staphylococcus aureus was 640 mg./kg. when administered orally. Nevertheless, mean lethal dose ($LD_{50}$) of the same in mice could not be determined due to its too low toxicity and can only be expressed as "higher than 10,000 mg./kg." when administered orally. Furthermore, rats were daily given lg./kg. of antibiotic B-5050 mixture orally for 1 month. During the observation, no appreciable difference from normal control group was observed, and the subsequently conducted autopsy showed no substantial change in the organs and viscera of the tested rats.

Staphylococci are pyogenic or pus-forming bacteria. They tend to produce circumscribed lesions, e.g. in the form of abscesses and the like, which often occur in the skin Staphylococci are the cause of furuncles and of carbuncles and other common wound infections. The new products of the present invention are useful in topical preparations for the treatment of this type of infection in mammals (dogs, cats, humans, etc.). Thus, a useful preparation for topical application to an infection due to Staphylococcus aureus is as follows:

Into 1 gram of wool fat is uniformly incorporated one of the following itemized components:
1. 20 mg. of antibiotic B-5050-A
2. 20 mg. of antibiotic B-5050-B
3. 20 mg. of antibiotic B-5050-C
4. 50 mg. of antibiotic B-5050-D
5. 50 mg. of antibiotic B-5050-E
6. 50 mg. of antibiotic B-5050-F
7. 20 mg. of the crystalline antibiotic B-5050 mixture as obtained in Example 1 or
8. 20 mg. of Crystal II as obtained in Example 2, and the mixture is then admixed uniformly with sufficient white petrolatum to make 10 grams of ointment.

This is topically applied in amount sufficient to cover the wound being treated, with gentle rubbing in, the application being made at least once daily and being repeated several times daily, if necessary or desired.

Due to the disclosed bactericidal and properties 5050of the new products of the invention, they are useful e.g. to disinfect hospital apparatus, etc. which are generally exposed to pathogenic gram-positive bacteria of the type which are sensitive to such products, as aforementioned. Disinfection is effected by application or spraying of a solution (e.g. methanolic or ethanolic, etc.) containing one of the following itemized components:

1. 20 meg/ml. of antibiotic B-5050-A
2. 20 mcg/ml. of antibiotic B-5050-B 3. 20 mcg/ml. of antibiotic B-5050-C
4. 50 mcg/ml. of antibiotic B-5050-D
5. 50 mcg/ml. of antibiotic B-5050-E
6. 50 mcg/ml. of antibiotic B-5050-F
7. 20 mcg/ml. of the crystalline antibiotic B-5050 mixture as obtained in Example 1 or
8. 20 mcg/ml. of Crystal II as obtained in Example 2, For better understanding to the readers, the following examples are given. In these examples as well as the foregoing, the abbreviations "ml.," "L.," "mm.," "cm.," "mcg.," "mg.," "g.," "kg.," "r.p.m.," "N" and "M" mean "milliliter(s)," "liter(s)," "millimeter(s)," "centimeter(s)," "microgram(s) or gamma(s)," "milligram(s)," "gram(s)," "kilogram(s)," "rounds (or reciprocations as the case may be) per minute," "normal concentration" and "mole concentration," respectively. As for the composition of the culture media, percentages are on weight per volume basis, i.e. grams per 100 milliliters. All percentages in other respects are on the weight basis unless otherwise noted.

EXAMPLE 1

500 ml. each of a pre-seed culture medium (pH 7.0) consisting of glucose (2.0 percent), soluble starch (3.0 percent), soybean flour (1.0 percent), cornsteep liquor (1.0 percent), "Polypepton" (trade name of casein hydrolyzate, produced by Daigo Nutritive Chemicals, Ltd. Osaka, Japan) (0.5 percent), sodium chloride (0.3 percent), calcium carbonate (0.3 percent) and water is charged in 2,000 ml.-Sakaguchi flasks, and sterilized. The sterilized medium is inoculated with a loopful of *Streptomyces hygroscopicus* (ATCC 21582) from an agar slant culture which has been cultivated for at least 4 days, and incubated at 28°C on a reciprocal shaker of 115 r.p.m. with 10 cm. stroke for 48 hours. The resulting broth in an amount of 1,000 ml. is used as the pre-seed culture.

The pre-seed culture is inoculated into 100 L. of a culture medium (pH 7.0) charged and sterilized in a 200 L-stainless steel tank, the medium consisting of glucose (3.0 percent), cornsteep liquor (0.5 percent), defatted soybean meal (1.0 percent), sodium chloride (0.5 percent), magnesium sulfate (0.05 percent), calcium carbonate (0.3 percent) and water. Incubation is conducted at 28°C with aeration of 100 L. per minute and agitation of 200 r.p.m. for 24 hours.

100 L. of the resulting seed culture is transferred into 1,000 L. of sterilized main culture medium of the same composition as that of the culture medium for seed culture, charged in a 2,000 L-stainless steel tank. Incubation is continued at 28°C with aeration of 1,000 L. per minute and agitation by impeller of 120 r.p.m. for 66 hours. During the incubation, "Actcol" (trade name of a polyoxypropylene trial mixture of OH number 56, sold by Takeda Chemical Industries, Ltd., Osaka, Japan) is added as antiforming agent at a concentration of about 0.05 percent relative to the whole medium. The culture broth thus obtained exhibits an antimicrobial potency of 350 units in terms of dilution units against *Bacillus subtilis* as the assay microorganism.

The broth is filtered. The filtered broth (950 L.) is adjusted to pH 8.5 with a 2N-aqueous NaOH solution and extracted with ethyl acetate (300 L.). The ethyl acetate layer is separated, washed with water, and extracted twice with 70 L. each of 0.005N-HCl. The aqueous extracts are combined, adjusted to pH 8.5 with diluted aqueous ammonia and again extracted twice with 45 L. each of ethyl acetate. The extracts are washed with water, dehydrated and concentrated in vacuo to 50 ml. To the concentrate is added 750 ml. of n-hexane to obtain 95 g. of crude powdery antibiotic B-5050 mixture.

The powdery product is dissolved in 450 ml. of benzene under warming. After the addition of 2 g. of activated carbon to the solution being warmed, the mixture is filtered, and the filtrate is allowed to cool on standing to separate 19.0 g. of antibiotic B-5050 mixture as colorless needles.

10 g. of the crystalline antibiotic B-5050 mixture is dissolved in 50 ml. of ethyl acetate, and is subjected to a column chromatography on silica gel (450 g., produced by Merck A.G., Germany, the granular size ranging 0.05 to 0.2 mm.). The charged materials are developed and eluted with a mixture of ethyl acetate and benzene (2 : 1 by volume). The first 600 ml. of the eluate showing antimicrobial activity is concentrated to dryness and the residue is dissolved in hot benzene. On standing, the solution separates 1 g. of colorless crystals which consist mainly of antibiotic B-5050-A.

After the column is eluted with 4 L. of the ethyl acetate-benzene mixture, it is further eluted with 3 L. of ethyl acetate to collect the eluates, which are then concentrated in vacuo to leave a residue. The residue is dissolved in hot benzene. On standing, the solution separates 550 mg. of colorless crystals which consist mainly of antibiotic B-5050-F.

500 mg. of the crystals consisting mainly of antibiotic B-5050-A are dissolved in 1.5 ml. of ethyl acetate, and again chromatographed on a column of silica gel (50 g., see above). The charged material is eluted with a mixture of ethyl acetate and benzene (1 : 1 by volume) to obtain fractions. Each fraction is tested for the active ingredients contained, by means of thin layer chromatography on silica gel (sold by Merck A.G., Germany under the name of "$HF_{254}$") with the use of a mixture of benzene and acetone (3 : 2 by volume) as the developer. The fractions which contain solely antibiotic B-5050-A as the active ingredient are collected, and concentrated in vacuo to leave a residue. On crystallization of the residue from benzene, 88.5 mg. of antibiotic B-5050-A is obtained as colorless prisms.

On the other hand, 350 mg. of the crystals consisting mainly of antibiotic B-5050-F are subjected to a column chromatography on the silica gel (50 g.) in the same manner as above. After the column is eluted with 700 ml. of ethyl acetate-benzene (2 : 1 by volume), it is further eluted with a mixture of ethyl acetate and benzene (3 : 1 by volume), followed by the tests by thin layer chromatography for the active ingredients on each fraction. The fractions which contain solely antibiotic B-5050-F as the active ingredient are collected, and concentrated in vacuo to leave a residue. The residue is crystallized to obtain 75.6 mg. of B-5050-F as colorless prisms.

EXAMPLE 2

In 2 L.-Sakaguchi flasks, 500 ml. each of a sterilized pre-seed culture medium of the same composition as used in Example 1 is inoculated with *Streptomyces hygroscopicus* (ATCC 21582), and the inoculated flask is incubated in the same manner as in Example 1 to prepare a pre-seed culture.

In 500 L.-stainless steel tank, there is prepared 200 L. of a culture medium of the same composition as sued in Example 1 for the seed culture. After being sterilized at 121°C for 20 minutes, the culture is inoculated with 2 L. of the above obtained pre-seed culture. Incubation is effected at 28°C with aeration of 200 L. per minute and agitation of 200 r.p.m. for 24 hours to prepare the seed culture for main fermentation.

200 L. of the thus prepared seed culture is transferred into 4,000 L. of a main culture medium of the same composition as above, charged in a 6,000 L.-stainless steel tank, and the cultivation is conducted at 28°C with aeration of 2,400 L. per minute and agitation by impeller of 180 r.p.m. for 48 hours. During the incubation, "Actcol" (see above) is used as antifoaming agent.

The culture broth is filtered. The filtered broth (4,000 L.) is adjusted to pH 9 with 2N-NaOH, and extracted with 1,330 L. of ethyl acetate, followed by washing with water to obtain 1,052 L. of ethyl acetate extract. The ethyl acetate solution is concentrated in vacuo to 100 L. The concentrated solution is extracted twice with 50 L. each of M/1.5-aqueous $KH_2PO_4$ solution previously adjusted at pH 4.0 with phosphoric acid. The extracts are combined, adjusted to pH 8.5 with a diluted aqueous ammonia solution, and extracted with 50 L. of ethyl acetate. The ethyl acetate solution is washed with water, dehydrated and concentrated in vacuo to leave a syrup. Addition of 3 L. of n-hexane to the syrup gives 330 g. of crude powder. 300 g. of the powder is dissolved in 1.1 L. of benzene under warming, and the solution is allowed to cool on standing to give 117 g. of crystals, which consist mainly of antibiotics B-5050-C, -D and -E. (Crystal I).

On the other hand, the ethyl acetate layer which was extracted with the phosphate solution is further extracted twice with 50 L. each of N/200 $H_2SO_4$, and the aqueous layers are combined, adjusted to pH 8 with a diluted aqueous ammonia solution and extracted three times with 30 L. each of ethyl acetate. The ethyl acetate extracts are combined, washed with water, dehydrated and concentrated in vacuo to leave a syrup. Addition of 1.5 L. of n-hexane to the syrup gives 160 g. of a crude powder. 150 g. of the powder is crystallized from hot benzene to give 72.5 g. of crystals, which consist mainly of antibiotic B-5050-A and -B together with a small amount of antibiotic B-5050-C (Crystal II). On thin layer chromatography under the same conditions as (a) or (c) described above as to an antibiotic B-5050 mixture of the six ingredients, Crystal II gives two spots i.e. at the Rf-values of 0.48 and 0.54 under conditions (a) or the Rf-valves of 0.66 and 0.71 under conditions (c).

2.0 g. of Crystal II is dissolved in 20 ml. of ethyl acetate, followed by the addition of 14 ml. of benzene. The solution is subjected to column chromatography on silica gel (Merck A.G., Germany, granular size ranging from 0.05 to 0.2 mm.) which is previously filled with an equivolume mixture of benzene and ethyl acetate. The chromatogram is developed firstly with ethyl acetate-benzene (1 : 1 by volume) to collect 200 ml. of the eluate, then with ethyl acetate-benzene (3 : 2 by volume) to obtain fractions exhibiting antimicrobial activity against *Bacillus subtilis*. The fractions of the same ingredient are respectively combined, concentrated and crystallized from benzene to give 435 mg. of crystals of antibiotic B-5050-A, on one hand, and 185 mg. of crystals of antibiotic B-5050-B, on the other hand.

10 g. of Crystal I is dissolved in 50 ml. of ethyl acetate, followed by the addition of 25 ml. of benzene. The solution is chromatographed on silica gel (400 g.) in the same manner as explained above. The column is eluted firstly with 3 L. of ethyl acetate-benzene (1 : 1 by volume), then with ethyl acetate-benzene (2 : 1 by volume). The eluate is fractionated by 500 ml. The fractions obtained by the 1 : 1 mixture contain antibiotics B-5050-A and -B. The first fraction obtained by the 2 : 1 mixture contain antibiotics B-5050-B and -C, the second fraction antibiotics B-5050-C and -D, the third fraction antibiotics B-5050-D and -E, and the last fraction antibiotics B-5050-E and F, respectively. 2 g. of the crystals obtained from the fraction containing antibiotics B-5050-B and -C is again dissolved in 15 ml. of ethyl acetate, followed by the addition of 10 ml. of benzene. The solution is subjected to column chromatography with 250 g. of silica gel, and the column is eluted with ethyl acetate-benzene (3 : 2 by volume). The eluate is fractionated by 20 ml. each. The fractions of the same component are combined, concentrated and crystallized from benzene or a mixture of ethyl acetate and n-hexane to give 83 mg. of crystals of antibiotic B-5050-B, 940 mg. of crystals of antibiotic B-5050-C and 75 mg. of crystals of antibiotic B-5050-D.

In the same way, 1.2 g. of the fraction containing antibiotics B-5050-D and -E is subjected to column chromatography on silica gel, to give 600 mg. of crystals of antibiotic B-5050-E.

The fraction, obtained subsequent to the fraction containing antibiotics B-5050-B and -C, contains antibiotic B-5050-C as the main ingredient. 770 mg. of the resultant crude crystals are again dissolved in 5 ml. of acetone, and the solution is subjected to column chromatography with 100 g. of silica gel in a similar way to the above explained, whereupon 220 mg. of antibiotic B-5050-C is obtained as crystals.

EXAMPLE 3

4,000 L. of the filtered broth obtained by the main fermentation as described in Example 2 is adjusted to pH 8.0, and is extracted with one third its volume of ethyl acetate. The ethyl acetate extract is concentrated to about 100 L. The concentrate is washed with 50 L. of water, and extracted three times with 50 L. each of an M/3-aqueous $KH_2PO_4$ solution previously adjusted to pH 3.0 with phosphoric acid. The aqueous extracts are combined, adjusted to a pH of 9 to 10 with an 8N-aqueous ammonia solution, and extracted with 75 L. of ethyl acetate. The ethyl acetate extract is washed three times with 25 L. each of water, and then concentrated to about 1.5 L. Addition of about 30 L. of n-hexane to the concentrate gives 522 g. of crude powder. Crystallization of the powder from benzene gives 272 g. of crystals of antibiotic B-5050 mixture.

In the above procedures, the use of a 0.2N-aqueous acetic acid solution in place of the $KH_2PO_4$ solution gives substantially the same result.

19 g. of the thus obtained antibiotic B-5050 mixture is dissolved in 75 ml. of acetone. The solution is subjected to column chromatography with 800 g. of silica gel (Merck A. G., see above). The column is eluted with 3,000 ml. of ethyl acetate-benzene (1 : 1 by volume) to give 7.25 g. of crystals consisting mainly of antibiotics B-5050-A and -B. Then, the column is eluted with ethyl acetate-benzene (2 : 1 by volume). The first fraction eluted with 1,100 ml. of the developer is similarly treated to give 2.22 g. of crystals consisting mainly of antibiotics B-5050-B and -C. The fraction obtained by the subsequent 200 ml. gives 0.90 g. of crystals which consist mainly of antibiotic B-5050-C. From the further subsequent 300 ml. is obtained 1.4 g. of a mixture consisting mainly of antibiotics B-5050-C and -D. From the last 600 ml. fraction is obtained 1.99 g. of crystals consisting mainly of antibiotics B-5050-D and -E. The column is eluted with 600 ml. of ethyl acetate-benzene (3 : 1 by volume) to give 0.645 g. of crystals consisting mainly of antibiotics B-5050-D and -E. From the last fraction eluted with 1,600 ml. of ethyl acetate is obtained 2.09 g. of crystals consisting mainly of antibiotic B-5050-F.

The above obtained antibiotics B-5050-A and -B crystals (7.25 g.) are dissolved in 40 ml. of acetone, and subjected to column chromatography with 400 g. of silica gel, followed by elution with ethyl acetate-benzene (1 : 1 by volume), whereby 1.5 g. of crystals of antibiotic B-5050-A and 0.65 g. of crystals of antibiotic B-5050-B are obtained.

The afore-obtained antibiotics B-5050-B and -C crystals (2.22 g.) are dissolved in 20 ml. of acetone, and column-chromatographed on 300 g. of silica gel, followed by elution with benzene-acetone (3 : 1 by volume) to give 0.398 g. of crystals of B-5050-B. Further elution with benzene-acetone (2 : 1 by volume) gives 0.269 g. of crystals of antibiotic B-5050-C.

The crystals consisting mainly of antibiotic B-5050-C (0.90 g.) are dissolved in 5 ml. of acetone, and column chromatographed on 100 g. of silica gel, followed by elution with ethyl acetate-benzene (2 : 1 by volume), to give 0.258 g. of crystals of antibiotic B-5050-C.

The antibiotics B-5050-C and -D crystals (1.40 g.) are dissolved in 10 ml. of acetone, and chromatographed on a column packed with 150 g. of silica gel, followed by elution with benzene-acetone (2 : 1 by volume), to give 0.596 g. of antibiotic B-5050-C and 0.187 g. of crystals of antibiotic B-5050-D.

The antibiotics B-5050-D and -E crystals (1.99 g.) are dissolved in 30 ml. of acetone, and column-chromatographed on 300 g. of silica gel, followed by elution with benzene-acetone (2 : 1 by volume), to give 0.304 g. of crystals of antibiotic B-5050-D and 0.187 g. of crystals of antibiotic B-5050-E.

The crystals consisting mainly of antibiotics B-5050-F (2.09 g.) are dissolved in 15 ml. of acetone, and column-chromatographed on 250 g. of silica gel, followed by elution with ethyl acetate-benzene (3 : 1 by volume), to give 0.585 g. of crystals of antibiotic B-5050-F.

EXAMPLE 4

A mixture of 120 ml. of n-hexane, 80 ml. of ethylene dichloride, 30 ml. of methanol and 6 ml. of water is well agitated and then allowed to stand, whereby it forms two layers. The lower layer is separated from the upper layer. In 6 ml. of the lower layer is dissolved 1 mg. of chlorphenol red. To the solutions are added 5 g. of "Celite" (trade name of processed diatomaceous earth distributed by Johns Manville Sales Corp., U.S.A.; particularly "Celite 535" is preferable) and 100 ml. of the above-separated layer. The mixture is vigorously agitated, and then hydrogen chloride is introduced into the mixture until the violet color of the indicator has turned to yellow. This suspension is allowed to flow onto a glass column little by little to prepare a uniform Celite column.

25 mg. of crystals of the antibiotic B-5050 mixture obtained in Example 3 is dissolved in 0.4 ml. of the above-separated upper layer, and the solution is subjected to chromatography with the above-prepared Celite column. The column is developed with the upper layer, whereby active ingredients are separated and observed as respective violet bands. Further elution gives the respective fractions of antibiotics B-5050-A, -B, -C, -D, -E and -F in this order. Thus, 4 mg. of B-5050-A, 3 mg. of B-5050-B, 5 mg. of B-5050-C, 4 mg. of a mixture of B-5050-D and -E, and 2 mg. of B-5050-F are obtained as crystals, respectively.

EXAMPLE 5

In the same manner as in Example 1, a seed culture of *Streptomyces hygroscopicus* (IFO-12995) is prepared.

2 ml. of the seed culture is inoculated in 50 ml. each of a main culture medium charged and sterilized in 200 ml.-Erlenmeyer flasks, said medium consisting of glucose (3.0 percent), cornsteep liquor (0.5 percent), defatted soybean meal (1.0 percent), sodium chloride (0.5 percent), magnesium sulfate (0.05 percent), dipotassium hydrogenphosphate (0.1 percent), potassium chloride (0.05 percent), calcium carbonate (0.3 percent) and water, and being adjusted to pH 7.0. Fermentation is conducted on a rotary shaker at 28°C for 96 hours. The filtered broth thus obtained exhibits an antimicrobial potency of 350 dilution units against *Bacillus subtilis*.

1.6 L. of the filtered broth is adjusted to pH 7.8, and is extracted with 800 ml. of ethyl acetate and with 600 ml. of the same. The combined extracts are washed with water, and extracted twice with 600 ml. each of N/200-aqueous HCl solution. The aqueous layers are combined, neutralized to pH 7 to 8 with N/10-aqueous NaOH solution, and extracted twice with 500 ml. each of ethyl acetate. The ethyl acetate extracts are washed with water, dehydrated with anhydrous sodium sulfate, and concentrated in vacuo. To the concentrate is added 30 ml. of n-hexane to give 59 mg. of crude powder. The powder is dissolved in hot benzene and the solution is allowed to stand, whereby 15 mg. of antibiotic B-5050 mixture is obtained as colorless needles.

EXAMPLE 6

2 ml. of a seed culture obtained in the same way as in Example 1 is inoculated in 50 ml. each of a main culture medium in 200 ml.-Erlenmeyer flasks, the medium being of the same composition as that of the main culture medium used in Example 1. Cultivation is made at 28°C on a rotary shaker for 96 hours. The filtered broth thus obtained exhibits an antimicrobial potency of 350 dilution units against *Bacillus subtilis*.

1.8 L. of the filtered broth is adjusted to pH 8.0, and extracted twice with 400 ml. each of ethyl acetate. After washing with water and dehydration, the ethyl acetate solution is concentrated in vacuo, and to the concentrate is added 30 ml. of n-hexane to obtain 210 mg. of crude powder. The powder is dissolved in 15 ml. of benzene under warming, and the solution is kept standing, whereby 59 mg. of antibiotic B-5050 mixture is obtained as crystals.

EXAMPLE 7

900 L. of a filtered broth obtained in the same manner as in Example 1 is treated in a similar way as in Example 1, to give 70 g. of a crude antibiotic B-5050 mixture.

The crude sample is dissolved in a mixture of ethyl acetate and benzene (2 : 1 by volume), and is chromatographed on a column packed with 2.1 Kg. of silica gel (Merck A.G., Germany, see above). The column is eluted with ethyl acetate-benzene (2 : 1 by volume), and colorless fractions are collected and concentrated to dryness. The residue is dissolved in 350 ml. of hot benzene, and the solution is kept standing to give 7.0 g. of colorless needles of antibiotic B-5050 mixture.

EXAMPLE 8

800 ml. of filtered broth obtained in the same manner as in Example 6 is adjusted to pH 7.6, and is allowed to pass through a column packed with 40 ml. of "Amberlite XAD-2" (trade name of a molecular sieve distributed by Rohm & Haas Co., U.S.A.). The column is washed with 200 ml. of distilled water, and then eluted with 200 ml. of 30 percent aqueous methanol solution to give a brown eluate which shows substantially no antimicrobial activity. Elution is continued with 500 ml. of 80 percent aqueous methanol solution to give the fractions containing most of the active ingredients. The fractions are concentrated in vacuo until methanol has been eliminated. The concentrate is adjusted to pH 7.5 to 8.5, and extracted twice with 100 ml. each of ethyl acetate. The ethyl acetate extracts are combined, washed with water, dehydrated, and concentrated in vacuo. To the concentrate is added n-hexane to give 53 mg. of a crude powder of antibiotic B-5050 mixture. The powder is dissolved in hot benzene, and the solution is kept standing to give 17 mg. of crystals.

EXAMPLE 9

1.0 g. of Crystal I obtained in Example 2 is dissolved in 100 ml. of ethyl acetate. The solution is extracted three times each with 100 ml.-portions Sørensen's buffer solutions of pH 5.5, pH 4.9 and pH 4.4 (containing M/10 disodium hydrogen citrate) in this order. Each fraction is adjusted to pH 9.5 with a diluted aqueous ammonia, and is extracted with its half volume of ethyl acetate. The ethyl acetate layer is washed with water, dehydrated and concentrated in vacuo to crystallize. Thus, from the fraction extracted with the buffer solution of pH 4.9, 365 mg. of antibiotic B-5050-C is obtained.

In this way, the ethyl acetate layer remaining after the extraction with those buffer solutions gives 110 mg. of crystals consisting mainly of antibiotics B-5050-A and -B; the fraction extracted with the buffer solution of pH 4.4 gives 165 mg. of crystals consisting mainly of antibiotics B-5050-B and -C; and the fraction extracted with the buffer solution of pH 5.5 gives 320 mg. of crystals which consist mainly of antibiotics B-5050-C, -D, -E and -F.

EXAMPLE 10

10 g. of Crystal II obtained in Example 2 is dissolved in 1 L. of ethyl acetate. The solution is extracted twice with 800 ml.-portions, and four times with 1 L.-portions, of Sørensen's buffer solutions of pH 4.9 and pH 4.4 in this order. Each fraction is adjusted to pH 9.5 with a diluted aqueous ammonia, and is extracted with a half volume of ethyl acetate. The ethyl acetate layer is washed with water, dehydrated and concentrated in vacuo to crystallize. The respective fractions are treated in the same manner as in Example 9. The ethyl acetate layer remaining after the extraction with the buffer solutions gives 4.2 g. of crystals consisting mainly of antibiotic B-5050-A. The fractions extracted with the buffer solution of pH 4.4 gives 3.8 G. of crystals consisting mainly of antibiotic B-5050-B. The fractions extracted with the buffer solution of pH 4.9 gives 1.3 g. of crystals consisting mainly of antibiotics B-5050-B and -C.

Having thus disclosed the invention, what is claimed is:

1. Antibiotic B-5050 characterized by the following properties:
   1. its crystal melting at about 137° to 141°C;
   2. elementary analysis for its crystals recrystallized from benzene being:
      C, 58.14±0.5; H, 7.88±0.3; N, 1.73±0.3;
   3. its molecular weight being 880±90, measured by vapor pressure osmosis in ethyl acetate;
   4. its specific rotation being $[\alpha]_D^{24}$ −76.4°±8°($c=1$, in ethanol);
   5. being positive to Dragendorff reaction and Erythromycin test, but being negative to Carbomycin test;
   6. being soluble in methanol, ethanol, acetone, ethyl acetate, methyl ethyl ketone, chloroform, benzene, diethyl ether or an aqueous acid solution, but hardly soluble in n-hexane or neutral water;
   7. having no significant maximum absorption in the range of ultraviolet rays when measured in methanol; and
   8. having significant infrared absorption bands at the wave numbers (cm$^{-1}$):
      3,448, 2,924, 1,736, 1,453, 1,376, 1,295, 1,239, 1,167, 1,081, 1,050, 968, 912, 861, 840.

2. Antibiotic B-5050-A, characterized by the following properties:
   1. its crystal melting at about 129° to 132°C (recrystallized from acetone:n-hexane (1 : 3 by volume) mixture);
   2. its elementary analysis being:
      C, 59.40±0.5; H, 8.15±0.3; N, 1.40±0.3;
   3. its molecular weight being 910±90, measured by vapor pressure osmosis in ethyl acetate;
   4. its specific rotation being $[\alpha]_D^{23}$: −72.3°±7° ($c=1$, in ethanol);

5. being positive to Dragendorff reaction and Erythromycin test, but being negative to Carbomycin test;
6. being soluble in methanol, ethanol, acetone, methyl ethyl ketone, ethyl acetate, benzene, diethyl ether, chloroform or an aqueous acid solution, but hardly soluble in n-hexane or neutral water;
7. having no significant maximum absorption in the ultraviolet ray range;
8. having significant infrared absorption bands at the wave numbers (cm$^{-1}$):
3,448, 2,941, 1,739, 1,458, 1,374, 1,295, 1,188, 1,167, 1,120, 1,086, 1,053, 1,033, 971, 917, 862.

3. Antibiotic B-5050-B, characterized by the following properties:
   1. its crystal, recrystallized from a mixture of acetone and n-hexane, melting at about 134° to 136°C;
   2. its elementary analysis being:
   C, 58.67±1.0; H, 8.02±0.5; N, 1.86±0.5;
   3. its molecular weight being about 800 to 900, measured by vapor pressure osmosis in ethyl acetate;
   4. its specific rotation being $[\alpha]_D^{23}$: −71.9°±7° ($c$=1, in ethanol);
   5. being positive to Dragendorff reaction and Erythromycin test, but being negative to Carbomycin test;
   6. being soluble in methanol, ethanol, acetone, methyl ethyl ketone, ethyl acetate, benzene, diethyl ether, chloroform or an aqueous acid solution, but hardly soluble in n-hexane or neutral water;
   7. having no significant maximum absorption in the ultraviolet ray range;
   8. having significant infrared absorption bands at the wave numbers (cm$^{-1}$);
   3,500, 2,990, 2,960, 1,740, 1,454, 1,370, 1,296, 1,233, 1,188, 1,166, 1,120, 1,080, 1,052, 1,025, 968, 916, 858, 842.

4. Antibiotic B-5050-C, characterized by the following properties;
   1. its crystal, recrystallized from a mixture of acetone and n-hexane, melting at about 135° to 138°C;
   2. its elementary analysis being:
   C. 57.93±1.0; H, 8.18±0.5; N, 1.69±0.5;
   3. its molecular weight being about 800 to 900, measured by vapor pressure osmosis in ethyl acetate;
   4. its specific rotation being $[\alpha]_D^{23}$: −76.0°±8° ($c$=1, in ethanol);
   5. being positive to Dragendorff reaction and Erythromycin test, but being negative to Carbomycin test;
   6. being soluble in methanol, ethanol, acetone, methyl ethyl ketone, ethyl acetate, benzene, diethyl ether, chloroform or an aqueous acid solution, but hardly soluble in n-hexane or neutral water;
   7. having no significant maximum absorption in the ultraviolet ray range;
   8. having significant infrared absorption bands at the wave numbers (cm$^{-1}$):
   3,460, 2,980, 2,940, 1,735, 1,455, 1,375, 1,357, 1,295, 1,270, 1,240, 1,183, 1,162, 1,080, 1,050, 1,028, 1,018, 972, 910, 862, 840.

5. Antibiotic B-5050-D, characterized by the following properties:
   1. its crystal, recrystallized from a mixture of acetone and n-hexane, melting at about 143° to 146°C;
   2. its elementary analysis being: 8.17±
   C, 57.48±1.0; H, 8.14±0.5; N, 1.64±0.5;
   3. its molecular weight being about 800 to 900, measured by vapor pressure osmosis in ethyl acetate;
   4. its specific rotation being $[\alpha]_D^{23}$: −76.2°±8°($c$=1, in ethanol);
   5. being positive to Dragendorff reaction and Erythromycin test, but being negative to Carbomycin test;
   6. being soluble in methanol, ethanol, acetone, methyl ethyl ketone, ethyl acetate, benzene, diethyl ether, chloroform or an aqueous acid solution, but hardly soluble in n-hexane or neutral water;
   7. having no significant maximum absorption in the ultraviolet ray range;
   8. having significant infrared absorption bands at the wave numbers (cm$^{-1}$):
   3,440, 2,946, 1,735, 1,450, 1,373, 1,357, 1,296, 1,274, 1,237, 1,163, 1,127, 1,083, 1,047, 1,031, 1,012, 972, 913, 862, 843.

6. Antibiotic B-5050-E, characterized by the following properties:
   1. its crystal, recrystallized from a mixture of acetone and n-hexane, melting at about 144° to 149°C;
   2. its elementary analysis being:
   C, 57.34±1.0; H, 8.25±0.5; N, 1.34±0.5;
   3. its molecular weight being about 800 to 900, measured by vapor pressure osmosis in ethyl acetate;
   4. its specific rotation being $[\alpha]_D^{23}$: −73.6°±7°($c$=1, in ethanol);
   5. being positive to Dragendorff reaction and Erythromycin test, but being negative to Carbomycin test;
   6. being soluble in methanol, ethanol, acetone, methyl ethyl ketone, ethyl acetate, benzene, diethyl ether, chloroform or an aqueous acid solution, but hardly soluble in n-hexane or neutral water;
   7. having no significant maximum absorption in the ultraviolet ray range;
   8. having significant infrared absorption bands at the wave numbers (cm$^{-1}$):
   3,430, 2,920, 1,732, 1,450, 1,373, 1,354, 1,296, 1,239, 1,163, 1,127, 1,084, 1,048, 1,032, 1,011, 970, 914, 862, 840.

7. Antibiotic B-5050-F, characterized by the following properties:
   1. its crystal, recrystallized from a mixture of acetone and n-hexane, melting at about 149° to 154°;
   2. its elementary analysis being:
   C, 58.59±0.5; H, 7.82±0.3; N, 1.62±0.3;
   3. its molecular weight being about 800 to 900, measured by vapor pressure osmosis in ethyl acetate;
   4. its specific rotation being $[\alpha]_D^{23}$: −77.7°±8°($c$=1, in ethanol);
   5. being positive to Dragendorff reaction and Erythromycin test, but being negative to Carbomycin test;
   6. being soluble in methanol, ethanol, acetone, methyl ethyl ketone, ethyl acetate, benzene, diethyl ether, chloroform or an aqueous acid solution, but hardly soluble in n-hexane or neutral water;

7. having no significant maximum absorption in the ultraviolet ray range;
8. having significant infrared absorption bands at the wave numbers (cm$^{-1}$):
3,425, 2,994, 1,745, 1,730, 1,460, 1,379, 1,362, 1,300, 1,242, 1,166, 1,133, 1,089, 1,053, 1,031, 973, 919, 864.

8. A method for producing antibiotic B-5050 which comprises culturing *Streptomyces hygroscopicus* No. B-5050 (ATCC 21582) in a culture medium containing assimilable carbon source and digestible nitrogen source under aerobic conditions at a pH of from about 6 to about 8 and at a temperature of from about 20° to about 43°C until antibiotic B-5050 is substantially accumulated in the culture broth, and recovering the accumulated antibiotic B-5050 therefrom.

9. A method for producing antibiotic B-5050A, which comprises culturing *Streptomyces hygroscopicus* No. 5050 (ATCC 21582) in a culture medium containing assimilable carbon source and digestible nitrogen source under aerobic conditions at a pH of from about 6 to about 8 and at a temperature of from about 20° to about 43°C until antibiotic B-5050A is substantially accumulated in the culture broth, and recovering the accumulated antibiotic B-5050A in a substantially pure form therefrom.

10. A method for producing antibiotic B-5050 B, which comprises culturing *Streptomyces hygroscopicus* No. 5050 (ATCC 21582) in a culture medium containing assimilable carbon source and digestible nitrogen source under aerobic conditions at a pH of from about 6 to about 8 and at a temperature of from about 20° to about 43°C until antibiotic B-5050B is substantially accumulated in the culture broth, and recovering the accumulated antibiotic B-5050B in a substantially pure form therefrom.

11. A method for producing antibiotic B-5050C, which comprises culturing *Streptomyces hygroscopicus* No. 5050 (ATCC 21582) in a culture medium containing assimilable carbon source and digestible nitrogen source under aerobic conditions at a pH of from about 6 to about 8 and at a temperature of from about 20° to about 43°C until antibiotic B-5050C is substantially accumulated in the culture broth, and recovering the accumulated antibiotic B-5050C in a substantially pure form therefrom.

12. A method for producing antibiotic B-5050D, which comprises culturing *Streptomyces hygroscopicus* No. 5050 (ATCC 21582) in a culture medium containing assimilable carbon source and digestible nitrogen source under aerobic conditions at a pH of from about 6 to about 8 and at a temperature of from about 20° to about 43°C until antibiotic B-5050D is substantially accumulated in the culture broth, and recovering the accumulated antibiotic B-5050D in a substantially pure form therefrom.

13. A method for producing antibiotic B-5050E, which comprises culturing *Streptomyces hygroscopicus* No. 5050 (ATCC 21582) in a culture medium containing assimilable carbon source and digestible nitrogen source under aerobic conditions at a pH of from about 6 to about 8 and at a temperature of from about 20° to about 43°C until antibiotic B-5050E is substantially accumulated in the culture broth, and recovering the accumulated antibiotic B-5050E in a substantially pure form therefrom.

14. A method for producing antibiotic B-5050F, which comprises culturing *Streptomyces hygroscopicus* No. 5050 (ATCC 21582) in a culture medium containing assimilable carbon source and digestible nitrogen source under aerobic conditions at a pH of from about 6 to about 8 and at a temperature of from about 20° to about 43°C until antibiotic B-5050F is substantially accumulated in the culture broth, and recovering the accumulated antibiotic B-5050F in a substantially pure form therefrom.

* * * * *